(12) United States Patent
Chang

(10) Patent No.: US 6,277,432 B1
(45) Date of Patent: Aug. 21, 2001

(54) REDUCED CALORIE PLASTIC FAT COMPOSITION

(75) Inventor: Ping Wu Chang, Waterford, CT (US)

(73) Assignee: Cultor Food Science, Inc., Ardsley, NY (US)

(*) Notice: Subject to any disclaimer, the term of this patent is extended or adjusted under 35 U.S.C. 154(b) by 0 days.

(21) Appl. No.: 09/393,325

(22) Filed: Sep. 10, 1999

Related U.S. Application Data

(60) Provisional application No. 60/099,830, filed on Sep. 11, 1998.

(51) Int. Cl.$^7$ ................. A23D 7/00; A23D 9/00
(52) U.S. Cl. .............. 426/602; 426/603; 426/606; 426/607; 554/227
(58) Field of Search .................. 426/607, 608, 426/602, 603; 554/227

(56) References Cited

U.S. PATENT DOCUMENTS

| | | |
|---|---|---|
| 2,614,937 | 10/1952 | Baur . |
| 2,615,160 | 10/1952 | Baur . |
| 5,374,438 * | 12/1994 | Yost ........................ 426/607 |
| 5,378,486 * | 1/1995 | Sullivan ................... 426/549 |
| 5,378,490 | 1/1995 | Wheeler et al. . |
| 5,407,695 * | 4/1995 | Wheeler .................... 426/607 |
| 5,411,756 * | 5/1995 | Wheeler .................... 426/607 |
| 5,434,278 | 7/1995 | Pelloso et al. . |
| 5,552,174 | 9/1996 | Wheeler et al. . |
| 5,565,232 | 10/1996 | Wheeler et al. . |
| 5,662,953 * | 9/1997 | Wheeler .................... 426/607 |

FOREIGN PATENT DOCUMENTS

| | | |
|---|---|---|
| 791165 | 10/1954 | (GB) . |
| 822730 | 7/1956 | (GB) . |
| 9516014 | 6/1995 | (WO) . |

OTHER PUBLICATIONS

Huang 1994 J. Agric Food Chem 42: 453–460.*
Softly 1994 J. Agric Food Chem 42: 461–467.*
Narine 1999 JAOCS 76 (1) 7–13.*
Fomuso 1997 JAOCS 74 (3) 269–272.*
Swern 1979 Baileys Industrial Oil and Fat Products, vol. 1 4$^{th}$ Edition, Wiley Interscience New York p 368–379.*

* cited by examiner

*Primary Examiner*—Carolyn Paden
(74) *Attorney, Agent, or Firm*—Knoble & Yoshida, LLC

(57) ABSTRACT

Described are reduced calorie edible plastic fat compositions based on mixtures of triglycerides being various combinations of short ($C_2$ to $C_4$), saturated long ($C_{16}$ to $C_{22}$), and monounsaturated long ($C_{16}$ to $C_{22}$) chain fatty acid residues, and the use of such compositions in edible compositions such as shortenings and margarines.

16 Claims, No Drawings

REDUCED CALORIE PLASTIC FAT COMPOSITION

This application claims the benefit of U.S. Provisional Application No. 60/099,830, filed Sep. 11, 1998.

BACKGROUND OF THE INVENTION

1. Field of the Invention

This invention relates generally to reduced calorie edible plastic fat compositions based on mixtures of triglycerides bearing various combinations of short ($C_2$ to $C_4$) and long ($C_{16}$ to $C_{22}$) chain fatty acid residues, and the use of such compositions in edible compositions such as shortenings and margarines. More particularly, the reduced calorie plastic fat compositions of the present invention are based on such triglyceride mixtures wherein a portion of the long chain fatty acid residues contain monounsaturation, and wherein the plastic fat composition contains substantially no added conventional triglyceride plasticizers such as low-melting oils or high-melting fats.

2. Description of Related Art

Dietary fat is the most concentrated source of energy of all the nutrients, supplying nine (9) kcal/gram, about double that contributed by either carbohydrate or protein. The amount of fat in the American diet has increased in the last 60 years by about 25% (Mead, J., et al. Lipids, Plenum, N.Y., 1986, page 459), so that fats now provide approximately 40% (or more) of the daily caloric intake.

Fat contributes to the palatability and flavor of food, since most food flavors are fat-soluble, and to the satiety value, since fatty foods remain in the stomach for longer periods of time than do foods containing protein and carbohydrate. Furthermore, fat is a carrier of the fat-soluble vitamins, A, D, E, and K, and the essential fatty acids, which have been shown to be important in growth and in the maintenance of many body functions. Hence, major research efforts have focused on ways to produce food substances that provide the same functional and organoleptic properties as fats, but not the calories. Synthetic fats have been created and are now undergoing testing for safety. Unfortunately, many consumers are concerned with the synthetic connotation of food additives of this type and will not avail themselves of the advantage they offer. There is, consequently, a need for a fat which is low in calories and high in functionality but is not perceived as artificial.

The most abundant group of fats is triglycerides—esters of fatty acids with glycerol (1,2,3-propanetriol). Natural fats have a broad range of functionalities and are handled in different ways by the human digestive process.

Early studies reported that triglyceride fats having high melting points were less digestible (Deuel, H. J., The lipids, vol. II, Interscience Publishers, 1955, pages 218 to 220). Later investigators questioned the relationship between digestibility and melting points, and scrutinized instead the chain lengths and degree of unsaturation of fatty acid substituents. Straight chain, saturated fatty acids having 4 up to 10 carbon atoms were completely digested by rats, those having 10 to 18 carbons progressively less digested, and those having 18 or higher only slightly absorbed, while monounsaturated acids were about the same of saturated acids having 6 carbons (Carroll, K. K., J. Nutr. 64: 399–410 (1957) at 408).

In other triglyceride metabolic studies in man only limited areas of predictability could be found. In one study a coconut oil fraction containing predominantly saturated, long chain triglycerides bearing 89% stearic (C18) and 11% palmitic (C16) acid residues were absorbed 31%, compared to 98% for corn oil (Hashim S. A., and Babayan, V. K., Am. J. Clin. Nutr. 31: S273–276 (1978)). However, it was found that increasing the stearic acid content of dietary fat did not per se decrease absorbability; rather, absorbability could be decreased by increasing the amount of tristearin present (i.e., triglycerides having three stearic residues; see Mattson, F. H., J. Nutr. 69: 338–342 (1959)). To this observation were added the findings that, in the presence or absence of dietary calcium and magnesium, stearic acid was well absorbed by rats when esterified on the 2-position of triglycerides having oleic acid at the 1- and 3-positions, but absorption decreased when a second stearic was added to the 1-position (Mattson, F., et al., J. Nutr. 209: 1682–1687 (1979), Table 3, page 1685). Stearic acid in the 1-position was well absorbed from triglycerides having oleic in the 2- and 3-positions in the absence, but not in the presence, of dietary calcium and magnesium (ibid.). When stearic was in both the 1- and 3-positions, absorption decreased with or without dietary calcium and magnesium, but the effect was more pronounced when calcium and magnesium were sufficient (ibid.).

The digestibility of palmitic acid has also been studied. Palmitic acid was better absorbed by rats when situated at the 2-positions of triglycerides than at the 1- or 3-positions in naturally occurring fats commonly fed to infants, and total fat absorption was adversely influenced by increasing the palmitic and stearic acid content in the 1- and 3-positions (Tomereili et al., J. Nutr. 95: 583–590 (1968)).

While triglycerides high in stearic acid are less well utilized than others, they also tend to be high melting. Tristearin is a solid at room temperature; the alpha form is a white powder that melts at 55° C., which, on solidification, reverts to the beta form that melts again at 72° C. The melting points of 1,3-distearin with short or medium chain fatty acids at the 2-position are high (Lovegren, N. V., and Gray, M. S., J. Amer. Oil Chem. Soc. 55: 310–316 (1978)). Symmetrical disaturated triglycerides of stearic acid and/or palmitic, often oleic at the 2-position, melt fairly uniformly near body temperature, and this property is of advantage for cocoa butter and hard butter substitutes (see, for example U.S. Pat. No. 4,364,868, U.S. Pat. No. 4,839,192 and U.S. Pat. No. 4,873,109), and hardstocks for margarines and shortenings (see, for example, U.S. Pat. Nos. 4,390,561, 4,447,462, 4,486,457, 4,865,866 and U.S. Pat. No. 4,883, 684). Because of their functionality, high melting, high stearic fats have limited applications in food compositions requiring more plastic or liquid triglycerides.

Fats have been prepared by substituting acetic acid for a portion of the fatty acids occurring in ordinary fats or oils, thus producing triglycerides bearing short acetyl and long substituents. For saturated fats high in stearic acid, the substitution of acetyl groups for a portion of the stearyl groups lowers the melting point. These acetoglycerides were investigated during the 1950's and found to be digestible. Feeding studies indicated that the nutritive value of mono- and diacetin fats were essentially the same to animals as those fed the corresponding conventional triglycerides (Mattson, F. H., et al., J. Nutr. 59: 277–285 (1956), although acetooleins were more digestible than acetostearins (Ambrose, A. M., and Robbins, D. J., J. Nutr. 58: 113–124 (1956) and animals grew poorly when fed acetostearin as the sole dietary fat (Coleman, R. D., et al., J. Amer. Oil Chem. Soc. 40: 737–742 (1963)).

While lower melting than tristearin, acetostearins still have high melting points, limiting applications in food products requiring plastic or liquid fats. In fact, though melting points of compounds structurally related generally decrease with decreasing molecular weights (and mono- and distearins having medium to long saturated substituents follow this rule), the melting points of triglycerides in the $C_{18}C_nC_{18}$ and $C_nC_nC_{18}$ series where n=2 to 6, anomalously show the higher molecular weight $C_6$ (caproic acid) mono- and distearin derivatives to have lower melting points than the lower molecular weight $C_2$ (acetic acid) mono- and distearin derivatives (Jackson, F. L., et al., J. Amer. Chem. Soc. 73: 4280–4284 (1951) and Jackson, F. L., and Lutton, E. S., J. Amer. Chem. Soc. 74: 4827–4829 (1952)). Plastic fats containing acetostearins suggested for use as shortenings and the like were formulated to contain significant levels of unsaturated fats and typically employed significant level of fatty acids which would yield high saponification numbers or were liquid at room temperature (U.S. Pat. No. 2,614,937 and Baur, F. J., J. Amer. Oil Chem. Soc. 31: 147–151 (1954)).

Acetostearins are waxy fats having sharp melting points. In contrast to fats bearing medium and/or long substituents, acetostearins also exhibit unusual polymorphism (ibid., and Feuge, R. O., Food Technology 9: 14–318 (1955)). Because of their melting and crystal properties the fats have been suggested as useful for coating food products such as meat, fish, cheese, and candy (U.S. Pat. No. 2,615,159 and U.S. Pat. No. 2,615,160). Compositions of this nature are often referred to as "hot melts" and may contain antibiotics (U.S. Pat. No. 3,192,057) or polymeric materials (U.S. Pat. No. 3,388,085) to prolong the life of the coating.

The short chain fatty acids, acetic, propionic, and butyric acid, also called, as a group, volatile fatty acids, occur in the large intestine of all mammalian species so far studied (Cummings, J. H., Gut 22: 763–779 (1981)). Except for a small percentage of butyric acid in milk fat (i.e., about 3.5 to 4%), volatile fatty acids rarely occur in nature esterified to glycerol in fats, but are, instead, generally free by-products of fermentation in the gut. Physically, short chain fatty acids "are not at all 'fatlike' in character; in fact they are hydrophilic substances with complete miscibility with water" (Bailey's Industrial Oil and Fat Products, 4$^{th}$. ed., J. Wiley, New York, 1979, volume 1, pages 16 to 17).

Early reports investigating the metabolism of short acids and triglycerides bearing short chain residues showed no regular relationship between nutritional value and the number of carbon atoms in the fat (Ozaki, J., Biochem. Z. 177: 156–167 (1926) at 163). For example, when fed to rats at levels of 5% and 10% of the diet, triacetin and tributyrin were nutritious, yielding weight gains in the top 20 to 25% of the fats tested, whereas tripropionin and triisovalerin were toxic (ibid.). In 1929, Eckstein reported that rats fed triolein and sodium butyrate grew at the same rate (J. Biol. Chem. 81: 163–628 (1929) at 622).

In 1935, L. E. Holt. et al., observed that infants fed milk enriched with tributyrin retained more fat per day (90.1 to 90.2%) than those in a butterfat control group (88.9%); the study concluded that absorption was favored by fatty acids with relatively short chains (J. Ped. 6: 427–480 (1935), Table VIII, page 445, and Conclusions, number 4 page 477). Similar results were obtained with triacetin, with absorption of tributyrin and triacetin reportedly superior to that of corn oil, although corn oil yielded higher calories (Snyderman, S. E., et al., Arch. Dis. Childhood 30: 83–84 (1955)). Substitution of triacetin, tripropionin, or tributyrin for half the glucose and starch in a rat diet did not significantly affect the digestible, metabolizable or net energy measurements, but lower body weight gains were observed in animals fed tributyrin in two experiments and triacetin in one experiment (McAtee, J. W., et al., Life Sci. 7: 769–775 (1968)).

In in vitro digestibility studies, tributyrin is readily cleaved by pancreatic lipase. Data measuring lipolysis as a function of chain length show tributyrin much more rapidly hydrolyzed than other substrates (see Sobotka, H., and Glick, D. J. Biol. Chem. 105: 199–219 (1934), comparing triglycerides bearing three identical C4 to C18 acyl groups, and Desnuelle, P., and Savary, P., J. Lipid Res. 4: 369–384 (1963), comparing triglycerides bearing three identical C2 to C18 acyl groups), although some reports rank tripropionin slightly better (Weinstein, S. S., and Wynne, A. M., J. Biol. Chem. 112: 641–649 (1936), comparing triglycerides bearing three identical C2 to C6 acyl groups, and Willis E. D., in Desnuell, P., ed., The Enzymes of Lipid Metabolism, Pergamon Press, N.Y., 1961, pages 13 to 19, comparing triglycerides bearing three identical C2 to C18 acyl groups). In fact, because tributyrin is such a good substrate and because the triglyceride is sufficiently water-soluble to allow enzymatic measurements in a homogeneous solution, it is often selected as a lipase substrate standard (Ravin, H. A., and Seligman, A. M., Arch. Biochem. Biophys. 42: 337–354 (1953) at 353).

Other lipase preparations readily cleave short chain triglycerides, Tributyrin was found to be hydrolyzed with the greatest initial velocity by human milk lipase, while pig liver lipase hydrolyzed tripropionin and tributyrin with an equal initial velocity much greater than any other in a study comparing $C_2$ to $C_{18}$ triglycerides (Schonheyder, F., and Volqvartz, K., Enzymologia 11: 178–185 (1943)). Tributyrin was hydrolyzed more readily than $C_6$ to $C_{18}$ triglycerides by human milk bile salt-activated lipase (Wang, C. S., et al., J. Biol. Chem. 258: 9197–9202 (1983)). A liver lipase hydrolyzed trivalerin the fastest, with tributyrin the second fastest (Sobotka and Glick, cited above).

In contrast to triglycerides being long chain ($C_{16}$ to $C_{24}$) fatty acids and those bearing short chain fatty acids, medium chain triglycerides, generally obtained from kernel oils or lauric fats and encompassing those substituted with $C_6$ to $C_{12}$, predominantly $C_8$ to $C_{10}$, fatty acids, have been of particular interest because they are more rapidly absorbed and metabolized, via a different catabolic route than those bearing long chain fatty acids (see a review by Babayan, V. K., in Beare-Rodgers, J., ed., Dietary Fat Requirements in Health and Development, A.O.C.S. 1988, chapter 5, pages 73 to 86). Hence, medium chain triglycerides have been employed in premature infant formulas and in the treatment of several malabsorption syndromes (ibid.). Feeding studies by H. Kaunitz, et al., demonstrated the usefulness of medium chain triglycerides in weight maintenance and obesity control in rats (J. Amer. Oil Chem. Soc. 35: 10–13 (1957)).

Several research groups have exploited the physical and nutritional properties of medium chain fatty acids by suggesting that triglycerides having stearic and/or behenic acid in combination with medium chain substituents be used as low calorie fats (EP-A-0322027 defining medium chain substituents as comprising $C_6$ to $C_{10}$ residues, and JP-A-02/158695 defining medium chain substituents as comprising $C_4$ to $C_{12}$ residues. The latter publication, however, exemplified only trace amounts of $C_4$ fatty acids, and suggested incorporating 0 to 1 long chain, unsaturated residues as well.) Low calorie triglyceride mixtures having stearic acid at the 1-position and medium and unsaturated residues in the other position have also been suggested (U.S. Pat. No. 4,832,975).

More recently, a number of publications have described reduced calorie (less than nine kcal/gram) fat compositions comprising mixtures of triglycerides bearing various combinations of long ($C_{16}$ to $C_{22}$) and short chain ($C_2$ to $C_4$) fatty acid residues (see e.g., U.S. Pat. Nos. 5,258,197, 5,378,490, 5,407,695, 5,456,939, 5,552,174, 5,565,232 and U.S. Pat. No. 5,662,953). Various analogs have been commercialized for a wide variety of uses under the trade designation "BENEFAT" of Cultor Food Science, Inc. (Ardsley, N.Y.).

All of the above-mentioned references are hereby incorporated by reference for all purposes as if fully set forth.

While a wide variety of long and short chain fatty acid residues have been exemplified in the just mentioned references (U.S. Pat. Nos. 5,258,197, 5,378,490, 5,407,695, 5,456,939, 5,552,174, 5,565,232 and U.S. Pat. No. 5,662,953), the clear preference is for the triglyceride mixtures to be substantially saturated because the presence of unsaturation detrimentally contributes to the caloric value.

When these fully saturated triglyceride mixtures are used in plastic fat applications such as shortenings and margarines, however, it has been found extremely difficult to arrive at an appropriate combination of short and saturated long chain residues to provide a composition which in and of itself has the appropriate physical properties to function as a plastic fat, yet still retain a desirable low caloric value. Usually, when caloric value is closely controlled, the result is a fat which is either too hard or soft (oily) and, for use in a plastic fat composition, requires the conventional addition of a "plasticizing additive" such as a normal triglyceride fat like a natural oil or a hard fat to compensate. Such conventional triglyceride plasticizing additives are disclosed, for example, in previously incorporated U.S. Pat. No. 2,614,937 and U.S. Pat. No. 5,378,490. The use of these triglyceride oils or hard fats, however, is detrimental to the caloric value of the plastic fat composition because they contribute 9 kcal/gram to the mixture.

It would, therefore, be highly desirable to provide a plastic fat composition based on triglyceride mixtures, which has flexibility in the short and long chain combination, yet retains the lower calorie advantage of the current substantially saturated varieties.

SUMMARY OF THE INVENTION

These and other objects are accomplished by the present invention, which provides a reduced-calorie, edible plastic fat composition comprising a triglyceride mixture of two or more triglycerides of the following formulae:

 (SSL)

 (SLS)

 (LLS)

 (LSL)

wherein each R is independently, a long chain fatty acid residue having between 16 and 22 carbon atoms;

each R' is, independently, a short chain acid residue selected from the group consisting of acetyl, propionyl and butyryl;

said mixture contains between about 40 wt % to about 95 wt % di-short (SSL and SLS) species, and from about 5 wt % to about 60 wt % di-long (LLS and LSL) species, with wt % being based on the total weight of the di-short and di-long species;

from about about 3 wt % to about 40 wt % of the R groups are unsaturated, said unsaturation being substantially monounsaturation, with wt % being based on the total weight of R groups in the mixture;

said triglyceride mixture is plastic at ambient temperature; and said composition contains no more than about 20 wt % of triglyceride plasticizing additive, with wt % being based on the total weight of the composition.

By "reduced-calorie", it is meant that the plastic fat composition delivers less calories than naturally occurring fats, that is less than 9 kcal/gram. Preferably, the plastic fat compositions in accordance with the present invention are formulated to deliver less than about 7 kcal/gram, more preferably less than about 6 kcal/gram, and especially less than about 5.5 kcal/gram.

Depending on the preparative process of the triglyceride mixtures used in the present plastic fat compositions, these mixtures may also contain minor amounts of triglycerides of the following formulae:

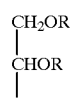 (LLL)

 (SSS)

wherein R and R' have the meanings set forth above. It is, however, preferred that the triglyceride mixture as such contains no more than about 2 wt % each, and preferably no more than 1 wt % each, of these tri-short (SSS) or tri-long (LLL) triglyceride species.

As depicted above, the triglycerides employed in this invention are compounds consisting of three molecules of acid esterified to glycerol, 1,2,3-propanetriol, having the formula $(CH_2OH)_2CHOH$. The acids are selected from short $C_2$ to $C_4$ acids, saturated long $C_{16}$ to $C_{22}$ acids, and monounsaturated long $C_{16}$ to $C_{22}$ acids.

Methods of using the present inventive low calorie plastic fats and food products incorporating them are also disclosed. The low calorie plastic fats of this invention are especially advantageous in margarine and shortening fat compositions.

Also disclosed are methods of reducing the caloric content of fat containing compositions, such as shortenings and maragarines, by replacing a portion of the fat content with a plastic fat composition in accordance with the present invention.

These and other features and advantages of the present invention will be more readily understood by those of ordinary skill in the art from a reading of the following detailed description.

DETAILED DESCRIPTION OF THE PREFERRED EMBODIMENTS

In the practice of this invention, the reduced calorie plastic fats are formulated with mixtures of triglycerides enriched with short ($C_2$ to $C_4$, and preferably $C_2$ to $C_3$) acid residues and long ($C_{16}$ to $C_{22}$) fatty acid residues, a portion of which are monounsaturated.

The short (volatile) acid residue, R', has more than 4 carbons, and preferably 2 or 3 carbons. R' is derived from a carboxylic acid of the formula SCOOH, where S is a short chain aliphatic group having 1 to 3 carbon atoms. As denoted herein, where R' is described as having 2, 3 or 4 carbons, compositions with R' groups having predominantly 2, 3 or 4 carbons are included. Acylation of a glycerol hydroxyl by acid SCOOH results in the attachment of short chain S to the glycerol backbone by means of an ester linkage (—O—(CO)—). Where this is more than one R' attached to a glyceride, the R' groups may be the same or different. As used herein, the term "acid residue" refers to an acyl group comprising a short chain portion, here S, and a carbonyl group, so that R'=S—(CO)—.

The short chain S may be derived from acetic (ethanoic), propionic and/or butyric (butanoic) acid. As used herein, chemical names include isomeric variations; for example, "butyric acid" includes normal-butyric acid (butanoic) and iso-butyric (2-methylpropanoic acid. Preferred acids are acetic and propionic, and mixtures of these.

The long fatty acid residue, R, has from 16 to 22, and preferably from 16 to 20 carbons. R is an acyl group comprising an aliphatic portion and a carbonyl, and is derived from a fatty acid of the formula LCOOH, where L is an aliphatic group having 15 to 21 carbons; thus R=L—(CO)—. Acylation of a glycerol hydroxyl by acid LCOOH results in the attachment of long chain L to the glycerol backbone by means of an ester linkage (—O—(CO)—). Where there is more than one R group attached to a glycerol backbone, the R groups may be the same or different.

Saturated R groups may be derived from any synthetic or natural, straight or branched organic acid processing the appropriate number of carbon atoms including, but not limited to, palmitic (hexadecanoic), stearic (octadecanoic), arachidic (eicosanoic), behenic (docosanoic) and the like acids. Saturated R groups may also be derived from an unsaturated acid which has been fully hydrogenated. Examples of such unsaturated acids including, but are not limited to, palmitoleic (9-hexadecenoic), oleic (cis-9-octadecenoic), elaidic (trans-9-octadecenoic), vaccenic (trans-11-octadecenoic), linoleic (cis, cis-9,12-octadecedienoic), linolenic (9,12,15-octadecatrienoic and 6,9,12-octadecatrienoic), eleostearic (9,11,13-octadecatrienoic), arachidonic (5,8,11,14-eicosatetraenoic) and the like acids. Chemical names include isomeric variations. Unsaturated R groups may be derived directly from the monounsaturated variations of these unsaturated acids, or the partially hydrogenated polyunsaturated species.

The various R groups can be mixtures of fatty acids and can be derived, for example, from non-hydrogenated, partially hydrogenated or fully hydrogenated oils such as soybean, safflower, sunflower, high oleic sunflower, sesame, peanut, corn, olive, rice bran, babassu nut, palm, mustard seed, cottonseed, poppyseed, low erucic rapeseed, high erucic rapeseed, shea, marine, meadowfoam and the like oils. Preferred oils are those which can be partially hydrogenated to achieve the desired monounsaturation content in the final triglyceride mixture. Preferred embodiments employ partially hydrogenated soybean oil, partially hydrogenated cottonseed oil, partially hydrogenated fish oil, partially hydrogenated sunflower oil, partially hydrogenated safflower oil, partially hydrogenated canola oil mixtures thereof, and mixtures of one or more of the above with a fully hydrogenated such oil.

The oils may be hydrogenated before or after incorporation into the triglyceride mixtures.

The long and short substituents are preferably selected to provide a physical form to the triglyceride mixture which is in and of itself in plastic at ambient temperature (20° C.). To the extent that the triglyceride mixtures are insufficiently plastic (either too hard or too oily) for the desired end use, minor amounts of conventional triglyceride plasticizing additives, such as oils or hard fats, can be added to the plastic fat composition to achieve the desired plasticity. This, however, is not a preferred option because such conventional triglyceride plasticizing additives add undesirable caloric value to the final composition. According to the present invention, the plastic fat compositions should contain no more than 20 wt %, preferably no more than about 15 wt %, more preferably no more than about 10 wt %, still more preferably no ore than about 5 wt %, and especially subtantially none, of such a plasticizing additive based on the total weight of the plastic fat composition.

A relatively minor portion of the R groups may also be replaced with medium-long ($C_{12}$–$C_{14}$) chain fatty acid residues (preferably not more than 10 wt % based on the weight of the R groups) derived from oils such as coconut oils, but this may undesirably add to the caloric value of the triglyceride mixture and limit formulation options.

An advantage of the present invention is that the inclusion of some monounsaturation in the L groups allows a broader and easier modulation of the functional properties by the selection of S and L groups as well as by the proportions of SLS, SSL, LLS and LSL components in the mixtures.

The molar ratio of S to L groups in the triglyceride mixtures may be determined using conventional proton or carbon nuclear magnetic resonance techniques (hereinafter referred to as NMR), or any quantitative procedure known to those skilled in the art.

The choice of the short and long acid residues and the amount of SSL/SLS and SLL/LSL in the mixtures can be used to modulate the solids contents for fats having the same (or different) capillary melting points so that the functional properties may be further modified. By the term "solids content" is meant the percentage of a fax that exists in crystalline form at a given temperature. Solid fat contents (herein abbreviated S.F.C.) are determined using well-known differential scanning calorimetry (DSC) techniques.

The weight percentage of LLS and LSL in the triglyceride mixtures can range from about 5 % to about 60 wt % based on the total weight of the di-long and di-short species. In preferred embodiments, the LLS and LSL weight percentage is from about 15 wt % to about 60 wt %, and more preferably from about about 20 wt % to about 40 wt %. Conversely, the weight percentage of SSL and SLS in the triglyceride mixture can range from about 40 wt % to about 95 wt %, preferably from about 40 wt % to about 85 wt %, and more preferably from about 60 wt % to about 80 wt %.

In addition, from about 3 wt % to about 40 wt %, preferably from about 5 wt % to about 30 wt %, and especially from about 5 wt % to about 20 wt %, of the R groups are unsaturated, with wt % being based on the total weight of the R groups. This unsaturation is substantially monounsaturation, although polyunsaturation can be present in minor amounts as impurities from the hydrogenated/partially hydrogenated oil raw materials.

The triglyceride mixtures making up the low calorie plastic fat compositions of this invention may be prepared using synthetic procedures known to those skilled in the art, such as, for example, directly esterifying glycerol or glycerol esters with fatty acids, fatty acid halides (notably chlorides) or fatty acid anhydrides, transesterifying glycerol with fatty acid esters, or interesterifying long an short chain triglycerides for such time and under such conditions that triglycerides bearing the desired combination of long and short residues form. Starting materials for triglyceride preparations may be obtained commercially or isolated from natural sources. Alternatively, component triglycerides may be isolated from natural or processed fats or oils, or fractions thereof.

A preferred method for preparing the triglyceride mixtures is to use a random interesterification of triacetin, tripropionin and/or tributyrin with a partially hydrogenated oil (or a mixture thereof with a fully hydrogenated oil). Procedures for such random interesterifications are generally well known in the art, as exemplified by previously incorporated U.S. Pat. Nos. 2,614,937, 5,258,197, 5,378,490, 5,407,695, 5,456,939, 5,552,174, 5,565,232 and U.S. Pat. No. 5,662,953, as well as U.S. Pat. Nos. 2,615,160, 5,434,278, GB791165, GB822730 and WO95/16014 (which are also incorporated by reference herein for all purposes as if fully set forth.

The low calorie plastic fat compositions of this invention may be incorporated into any appropriate food composition, or used in conjunction with any edible material. They are preferably used to replace at least a portion of the full caloric value fat used in the edible material so as to provide a significant reduction of the calorie content delivered by the edible material. For example, about a 10 wt % or greater replacement would be effective for this purpose, and replacements of at least about 25 wt %, more particularly 50 wt %, 75 wt %, 90 wt % over even 100 wt % replacement is desired in many cases (wt % being based on the weight of the full caloric value fat in the edible material).

The term "edible material" is broad and includes anything edible, whether or not intended for nutrition.

Representative of fat-containing edible materials which can contain, in addition to other food ingredients, the reduced calorie plastic fats of this invention in full or partial replacement of natural or synthetic fat are margarine, margarine substitutes and blends; flavored bread or biscuit spreads; frostings and fillings; bakery products, e.g., cakes, breads, rolls, pastries, cookies, biscuits, and savory crackers; and mixes or ingredient premixes for any of these.

The reduced calorie plastic fats find particular advantageous use as a fat replacements in shortenings and in fat-containing edible emulsions comprising an oil phase and an aqueous phase, including those high in fat, such as margarines, and those high in water, such as low fat spreads. The preparation and use of such shortenings, edible emulsions and margarines is in general well-known to those of ordinary skill in the art, as exemplified by many of the previously incorporated references as well as, for example, the following which are also incorporated by reference herein for all purposes as if fully set forth:

Moran, David P. J., and Kanes K. Rajah, eds. *Fats in Food Products*. Glasgow:Blackie Academic and Professional, 1994.

Richard D. O'Brien. *Fats and Oils: Formulating and Processing for Applications*. Technomic Pub. Co., 1997.

Alton E. Bailey, ed. *Bailey's Industrial Oil & Fat Products: Edible Oil and Fat Products: Processing Technology*. Volume 4. John Wiley & Sons (5th Ed.), 1995. References may be had to these publications for further details.

The following examples are presented to further illustrate and explain the present invention and should not be taken as limiting in any regard. Unless otherwise indicated, all parts and percentages are by weight, and are based on the weight at the particular stage of the processing being described.

EXAMPLE 1

A mixture of 38 kg tripropionin (Chemoxy International), 72 kg full hydrogenated soybean oil (AC Humko Dritex S 2 IV), and 14 kg partially hydrogenated soybean oil (AC Humko Dritex S 40 IV) was heated to 80–85° C. and dried by stirring at a pressure of approximately 300 mm Hg. With continued stirring, 707 g of sodium methoxide was added. The mixture was heated to 110° C. under slight vacuum and stirred for three hours. The reaction was quenched by addition of 13 kg of acidic bleaching clay (Solomon Tonsil FF). The bleaching clay was removed by filtration, and the filtrate was distilled at about 155° C. and $3-10\times10^{-3}$ mm Hg. The residue was then distilled at a temperature of about 260° C. and a pressure below $1\times10^{-3}$ mm Hg. A portion of the distillate was steam deodorized at about 160° C. and 1 mm Hg.

The product contained 67% di-short triglycerides (SSL and SLS) and 29% di-long triglycerides (SLL and LSL), and had the following fatty acid profile in weight percent: 25% C3, 3% C16 (monounsaturated), 9% C16 (saturated), 6% C18 (monounsaturated) and 57% C18 (saturated).

EXAMPLE 2

The product of Example 1 was blended with 5% by weight of fully hydrogenated soybean oil.

EXAMPLE 3

The product of Example 1 was blended with 10% by weight of fully hydrogenated soybean oil.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. A reduced-calorie, edible plastic fat composition comprising a triglyceride mixture of two or more triglycerides of the following formulae:

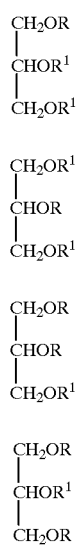

Formula SSL
CH₂OR
|
CHOR¹
|
CH₂OR¹

Formula SLS
CH₂OR¹
|
CHOR
|
CH₂OR¹

Formula LLS
CH₂OR
|
CHOR
|
CH₂OR¹

Formula LSL
CH₂OR
|
CHOR¹
|
CH₂OR wherein each R is, independently, a long chain fatty acid residue having between 16 and 22 carbon atoms;

each R' is, independently, a short chain acid residue selected from the group consisting of acetyl, propionyl and butyryl;

said mixture contains between about 40 wt % to about 95 wt % di-short species of the Formula SSL and the Formula SLS, and from about 5 wt % to about 60 wt % di-long species of the Formula LLS and the Formula LSL, with wt % being based on the total weight of the di-short and di-long species;

from about 3 wt % to about 40 wt % of the R groups are unsaturated, said unsaturation being substantially monounsaturation, with wt % being based on the total weight of R groups in the mixture;

said triglyceride mixture is plastic at ambient temperature; and said composition contains no more than about 20 wt % of a triglyceride plasticizing additive, with wt % being based on the total weight of the composition.

2. A composition according to claim 1, wherein the R groups in the triglycerides are derived from partially hydrogenated oils selected from the group consisting of corn oil, soybean oil, sunflower oil, safflower oil, canola oil, sesame seed oil, olive oil, and mixtures thereof.

3. A composition according to claim 1, wherein said composition is formulated to deliver less than 7 kcal/gram.

4. A composition according to claim 1, wherein each R is, independently, a long chain fatty acid residue having between 6 and 20 carbon atoms.

5. A composition according to claim 1, wherein said mixture contains between about 40 wt % to about 85 wt % di-short species of the Formula SSL and the Formula SLS, and from about 15 wt % to about 60 wt % di-long species of the Formula LLS and the Formula LSL, with wt % being based on the total weight of the di-short and di-long species.

6. A composition according to claim 1, wherein said mixture contains between about 60 wt % to about 80 wt % di-short species of the Formula SSL and the Formula SLS, and from about 20 wt % to about 40 wt % di-long species of the Formula LLS and the Formula LSL, with wt % being based on the total weight of the di-short and di-long species.

7. A composition according to claim 1, wherein from about 5 wt % to about 30 wt % of the R groups are unsaturated, said unsaturation being substantially monounsaturation, with wt % being based on the total weight of R groups in the mixture.

8. A composition according to claim 1, wherein from about 5 wt % to about 20 wt % of the R groups are unsaturated, said unsaturation being substantially monounsaturation, with wt % being based on the total weight of R groups in the mixture.

9. A composition according to claim 1, wherein said composition contains no more than about 10 wt % of triglyceride plasticizing additive, with wt % being based on the total weight of the composition.

10. A composition according to claim 1, wherein said composition contains substantially no triglyceride plasticizing additive.

11. An improved shortening based on an edible fat, wherein the improvement comprises replacing at least a portion of the edible fat with a reduced-calorie, edible plastic fat composition in order to reduce the caloric content delivered by the shortening, wherein the edible plastic fat composition is a composition according to claim 1.

12. An improved margarine composition based on an edible fat, wherein the improvement comprises replacing at least a portion of the edible fat with a reduced-calorie, edible plastic fat composition in order to reduce the caloric content delivered by the margarine, wherein the edible plastic fat composition is a composition according to claim 1.

13. An improved edible emulsion composition having an aqueous phase and a fat phase, wherein the improvement comprises replacing at least a portion of the fat phase with a reduced-calorie, edible plastic fat composition in order to reduce the caloric content delivered by the edible emulsion, wherein the edible plastic fat composition is a composition according to claim 1.

14. A method of reducing the calorie content delivered by a shortening based on an edible fat, by replacing at least a portion of the edible fat with a reduced-calorie, edible plastic fat composition, wherein the edible plastic fat composition is a composition according to claim 1.

15. A method of reducing the calorie content of a margarine composition based on an edible fat, by replacing at least a portion of the edible fat with a reduced-calorie, edible plastic fat composition, wherein the edible plastic fat composition is a composition according to claim 1.

16. A method of reducing the calorie content delivered by an edible emulsion composition having an aqueous phase and a fat phase, by replacing at least a portion of the fat phase with a reduced-calorie, edible plastic fat composition in order to reduce the caloric content delivered by the edible emulsion, wherein the edible plastic fat composition is a composition according to claim 1.

* * * * *